Feb. 27, 1940.  H. C. MOREHOUSE  2,191,769
BRAKE MECHANISM
Filed July 11, 1938
Fig.1.
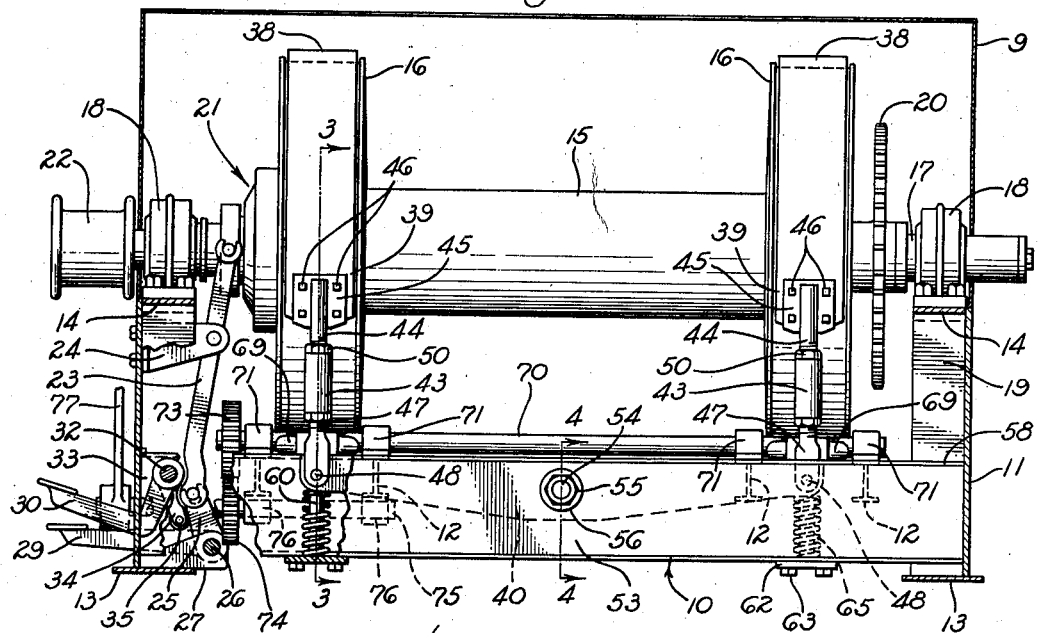
Fig.2.
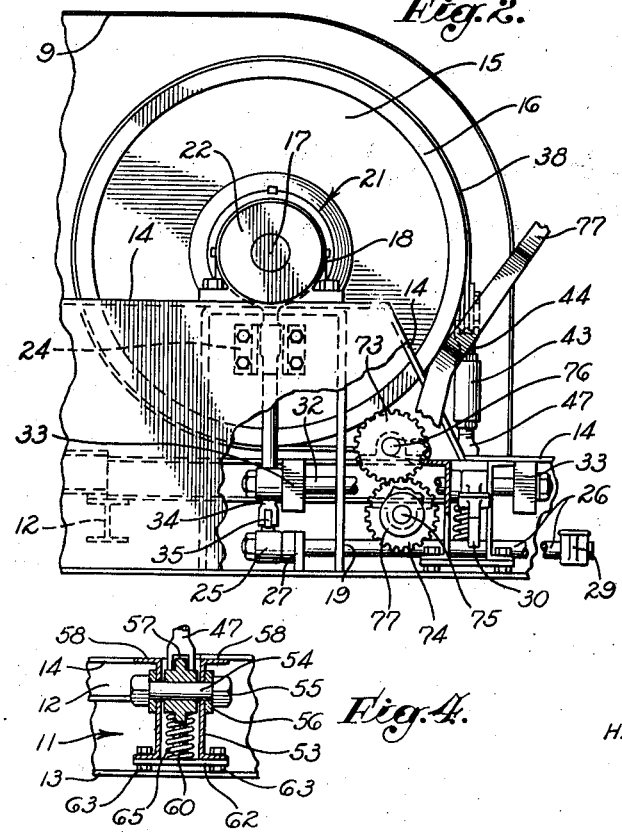
Fig.3.
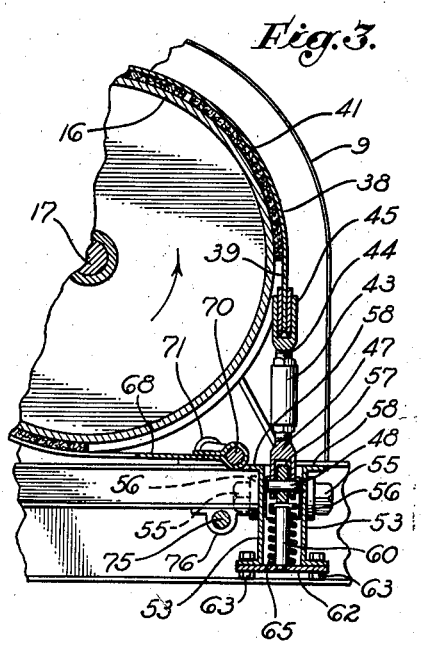
Fig.4.
INVENTOR
HARRY C. MOREHOUSE
BY
HARRIS, KIECH, FOSTER & HARRIS
FOR THE FIRM
ATTORNEYS Patented Feb. 27, 1940

2,191,769

UNITED STATES PATENT OFFICE 2,191,769

BRAKE MECHANISM

Harry C. Morehouse, Los Angeles, Calif., assignor to Wagner-Morehouse, Inc., Los Angeles, Calif., a corporation of California Application July 11, 1938, Serial No. 218,536

8 Claims. (Cl. 188—204)

My invention relates to brake mechanisms, with special reference to brakes for hoists and the like. While my invention is applicable to any rotary device having two axially spaced brake drums with corresponding brake bands, it will be described for the purpose of this disclosure as incorporated in the construction of a portable draw-works of a type commonly employed in drilling and servicing oil wells.

One object of my invention is to provide an efficient means for equalizing the braking action at the two ends of the draw-works cable drum together with adjustment means therefor. In this respect my invention is characterized by the concept of placing the equalizing means at the dead ends of the two brake bands and providing adjustable means for interconnecting the equalizing means with the brake bands. A feature of such an arrangement is that proper adjustment of the two connecting means always returns the equalizing means to a given normal disposition, a further object of my invention being to provide means for visually indicating variance of the equalizing means from that normal disposition. In the preferred form of my invention I propose to employ a rocking lever for the equalizing means and to mount it in a member of the frame of the draw-works whereby I not only save room but also am enabled to use the frame member as a reference for ascertaining departure of the equalizing lever from normal disposition.

A feature of my arrangement is that fixed safety stops may be employed to limit the rotation of the equalizing lever, no adjustment for such stops being necessary. Another feature of my invention is the conception of yielding means to urge the equalizing lever continuously toward the brake bands, such means being associated with the safety stops in the preferred form of my invention.

On a portable draw-works the brake lever is most conveniently located in a disposition to be rotated away from the draw-works in a downward direction to apply the brakes. Where cranks at the live ends of the brake bands are employed to place the bands under tension, such a disposition of the brake lever usually causes the cranks to be rotated toward the brake drums in releasing the brakes. One object of my invention is to employ a brake lever disposed in the desirable manner but to rotate the cranks away from the drums in releasing the brakes.

The above and other objects and advantages of my invention will be apparent in my detailed description to follow, taken with the accompanying drawing.

In the drawing:

Fig. 1 is a rear elevation partly in section showing a portable draw-works incorporating my invention;

Fig. 2 is a side elevation partly broken away;

Fig. 3 is a fragmentary vertical section taken along the line 3—3 of Fig. 1; and Fig. 4 is a fragmentary vertical section taken along the line 4—4 of Fig. 1.

The portable draw-works illustrated is partially enclosed by a sheet metal housing 9 and is mounted on a frame that includes a rear cross member generally designated 10, longitudinal members 11 at the sides of the frame and various inner frame members 12. The side members 11 have lower flanges 13 and upper flanges 14.

The spool or cable drum 15 has axially spaced brake drums 16 and is carried by a shaft 17 journaled in bearings 18, the bearings being mounted on the side members 11 and braced by bent bars 19 seated in the side members.

The shaft 17 is shown carrying a drive sprocket 20, a clutch generally designated 21, and a cathead 22 outside the frame. The clutch 21 is of a conventional type and may be controlled by conventional means including a clutch lever 23 pivotally mounted on a bracket 24 and a rocker arm 25. The rocker arm 25 is keyed to a rock shaft 26 journaled in brackets 27, and engages the lower end of the clutch lever 23 to form a clutch toggle. Engagement of the clutch 21 is accomplished by depressing a pedal 29 keyed to the rock shaft 26, and the clutch is released by depressing a second pedal 30 keyed to a rock shaft 32 that is journaled in brackets 33. A rocker arm 34 keyed to the rock shaft 32 carries a roller 35 that is swung inward against the toggle rocker arm 25 when the pedal 30 is depressed.

The brake mechanism proper to which my invention is directed includes a brake band 38 extending around each of the brake drums 16, the dead ends 39 of the bands being adjustably anchored to the arms of an equalizing lever 40. Each band has the usual brake lining 41. The adjustable anchorage for each band may, for example, include a turnbuckle 43. One end of the turnbuckle is threaded to a fitting 44 that has flanges 45 secured to opposite sides of the corresponding brake band as by bolts 46. Into the other end of the turnbuckle is threaded the shank of a clevis 47 that is pivotally connected to the equalizing lever 40 by a pin 48. To hold the turnbuckle assembly at adjusted positions, lock-nuts 50 are provided at each end of the turnbuckle 43.

In the preferred form of my invention, I provide means for visual indication of any rotation of the equalizing lever out of a dispositional normal to the alignment of the two brake bands 38. Such means may include a sighting edge on one or both sides of the equalizing lever and may be incorporated in the construction of the crossbeam 10 of the frame. For example, the crossbeam 10 may be of hollow construction comprising two spaced channel-irons 53 in the webs of which is mounted a central pivot pin 54 for the equalizing lever 40, the pivot pin being secured by a nut 55 and washer 56 on each end. The equalizing lever 40 has a straight upper edge 57 that is normally in the reference plane defined by the upper edges 58 of the two channels 53. When the equalizing lever varies even slightly from its normal disposition, one or the other of its arms may be noted as extending above the reference plane by simply sighting across the two channels 53. The equalizing lever may be returned to normal disposition by loosening one turnbuckle 43 and by tightening the other turnbuckle.

As a safety measure to prevent excessive rotation of the equalizing lever 40, if one brake band connection is broken, and to insure one of the brake bands being effective if the other is broken or disconnected, I provide safety stops in the forms of studs or pins 60 carried by plates 62 that are in turn attached to the channels 53 by suitable bolts 63. Preferably, these studs extend relatively close to the arms of the equalizing lever providing a clearance, say, of 1/16 inch so that failure of one brake band or its connections results in such slight rotation of the equalizing lever that effective anchorage is still provided for the other brake band.

In the arrangement described, any looseness or play in the connections of the equalizing lever tends to become noticeable whenever the brake bands are released from tension. Such lost motion may be eliminated by providing yielding means to urge the equalizing lever continuously upward. For example, I may provide helical springs 65 embracing each stud 60 in compression between the corresponding plate 62 and the corresponding arm of the equalizing lever 40.

The working ends 68 of the two brake bands are operatively connected to corresponding cranks 69 formed in a crank shaft 70, the crank shaft being journaled in suitable bearings 71 mounted on upper surfaces of the frame members 12. Keyed to the crank shaft 70 is a pinion 73 meshing with a second pinion 74 that is keyed to an operating shaft 75. The operating shaft is journaled in suitable bearings 76 mounted on lower surfaces of the frame members 12 and is controlled by a brake lever 77 keyed thereto outside one of the frame side members 11.

It will be noted that the brake lever 77 rotates outward and downward in a clockwise direction as viewed in Fig. 2, so that an operator standing at the rear end of the frame may use his weight to apply the brakes; but it will also be noted that by virtue of the gears in the operating mechanism the two cranks 69 rotate in a clockwise direction when the brakes are released, such clockwise rotation throwing the live ends of the brake bands outward away from the brake drums 16. Counter-clockwise rotation of the cranks in the release of the brakes would move the brake bands inward toward the brake drums and would favor an undesirable wrapping action, since the brake drums rotate in the direction of the arrow in Fig. 3 when a load is being lowered by the spool.

An important feature of my invention is that the brake operating mechanism and the brake equalizing mechanism are both out of the way, being, in effect, incorporated in the frame supporting the draw-works. This arrangement results in a maximum range of angles through which the cable may be extended from the drum.

Another feature of my invention to be noted is the efficient manner in which either or both of the brake bands may be removed or loosened sufficiently to permit minor repairs. It is merely necessary to unscrew a turnbuckle 43 to release the dead end of a brake band, and it is possible to reline such loosened brake band without completely removing the brake band from the apparatus.

For the purpose of disclosure and to teach the principles of my invention, I have described the preferred form of brake mechanism in specific detail. The right is reserved to all changes and modifications that come within the scope of my appended claims.

I claim as my invention:

1. Braking means for cooperation with a rotary device having two axially spaced cylindrical brake surfaces, said braking means comprising: two brake bands, one overlying each of said cylindrical surfaces; an equalizing lever having two arms near the dead ends of said brake bands; adjustable means interconnecting the dead ends of said brake bands and the corresponding arms of said lever; brake-operating means connected with the live ends of said bands; and means fixed adjacent said equalizing lever providing a fixed sighting edge for determining variance of said equalizing lever from a given plane, said sighting edge extending in said plane substantial distances alongside said lever on opposite sides of the axis of lever rotation.

2. Braking means for cooperation with a rotary device having two axially spaced cylindrical brake surfaces, said braking means comprising: two brake bands, one overlying each of said cylindrical surfaces; an equalizing lever having two arms near the dead ends of said brake bands; adjustable means interconnecting the dead ends of said brake bands and the corresponding arms of said lever; two stop means extending upward under said two arms respectively to limit movement of said lever; helical springs embracing said stop means and pressing upward directly against said two arms; and brake-operating means connected with the live ends of said bands.

3. The combination with a hoist drum having two axially spaced cylindrical brake surfaces of: a frame supporting said hoist drum from below, said frame being defined in thickness by two spaced planes; two brake bands, one overlying each of said cylindrical surfaces; an equalizing lever having two arms for the dead ends of said brake bands, said lever being pivotally mounted to said frame to lie at least for the most part below the upper of said two planes to avoid occupancy of space between said frame and hoist drum; adjustable means interconnecting the dead ends of said brake bands and the corresponding arms of said lever; and brake-operating means on said frame connected with the live ends of said bands.

4. The combination as set forth in claim 3 in which said lever has a straight upper edge and in which said frame provides a straight edge for sighting relative to said lever edge to ascertain departure of the lever edge from a normal position of approximately parallel relation to said frame edge.

5. The combination with a hoist drum having two axially spaced cylindrical brake surfaces of: a frame supporting said hoist drum from below, said frame being defined in thickness by two spaced planes; two brake bands, one overlying each of said cylindrical surfaces; an equalizing lever having two arms for the dead ends of said brake bands, said lever being pivotally mounted to said frame to lie at least for the most part below the upper of said two planes to avoid occupancy of space between said frame and hoist drum, said lever having a straight upper edge for rotation into a normal position at least approximately in the upper of said two planes whereby said frame may serve as sighting means to ascertain departure of said lever from said normal position; two stop means mounted on said frame for contact with arms to limit movement of said lever; and brake-operating means on said frame connected with the live ends of said bands.

6. A combination as set forth in claim 5 in which said stop means comprise two upwardly extending members below said upper plane, and in which springs guided by said members press upward against said two arms of said lever.

7. The combination with a hoist drum having two axially spaced cylindrical brake surfaces of: a frame supporting said hoist drum from below; a hollow frame member included in said frame and extending substantially parallel with the axis of said drum; two brake bands, one overlying each of said cylindrical surfaces; and an equalizing lever having two arms for the dead ends of said brake bands, said lever being pivotally mounted within said hollow frame member with the upper edge of the lever visible near the upper edge of said hollow frame member whereby departure of said lever edge from normal parallel relationship to said frame edge may be readily observed.

8. The combination with a hoist drum having two axially spaced cylindrical brake surfaces adapted to be driven by hoist loads in a given rotary direction of: a frame supporting said hoist drum; an equalizing lever having two arms corresponding to said brake surfaces; sighting means provided by said frame for ascertaining departure of said lever from a normal disposition; a pair of brake bands adjustably connected respectively to said arms and extending around said brake surfaces in said given rotary direction; and operating mechanism including a pair of cranks connected respectively to the live ends of said bands, said cranks being constructed and arranged to rotate in said rotary direction to tighten said bands and in tightening to act within the last few degrees of maximum possible rotation away from the loose positions of the bands thereby to achieve a high leverage ratio, said mechanism being built into said frame to favor maximum clearance around the drum and being free of obstacles to lateral movement of said bands towards the axis of rotation of said cranks when the bands are being tightened.

HARRY C. MOREHOUSE.